United States Patent
Böttcher et al.

[11] 3,863,543
[45] Feb. 4, 1975

[54] PATTERN TRANSMITTING DEVICES

[75] Inventors: Albert Böttcher, Scharzfeld Harz; Hans Maass, Bad Lauterbert im Harz, both of Germany

[73] Assignee: Franz Kuhlmann KG, Harz, Germany

[22] Filed: Nov. 28, 1973

[21] Appl. No.: 349,444

[52] U.S. Cl. .............. 90/13 C, 90/13 B, 90/13.1, 51/127, 51/165.72, 125/11 PT
[51] Int. Cl. ............................................ B23c 1/16
[58] Field of Search ........ 90/13 C, 13.1, 13.8, 13 B; 51/127, 165.72; 125/11 PT

[56] References Cited
UNITED STATES PATENTS
2,047,013   7/1936   Dorn .................................. 90/13 C
3,584,535   6/1971   Rossberger ...................... 90/13.1

*Primary Examiner*—Gil Weidenfeld
*Attorney, Agent, or Firm*—Scrivener Parker Scrivener and Clarke

[57] ABSTRACT

A pattern transmitting device for a machine having a tool for the three-dimensional machining of a workpiece from a drawing and a contoured pattern comprises a drawing reader which automatically follows the outline of the drawing and which transmits its horizontal movements to the tool through a guide arrangement connected between the drawing reader and a pantograph supporting the tool. A tracer device follows the height contours of the pattern and transmits its movements to the tool to move the latter in its feed direction.

8 Claims, 9 Drawing Figures

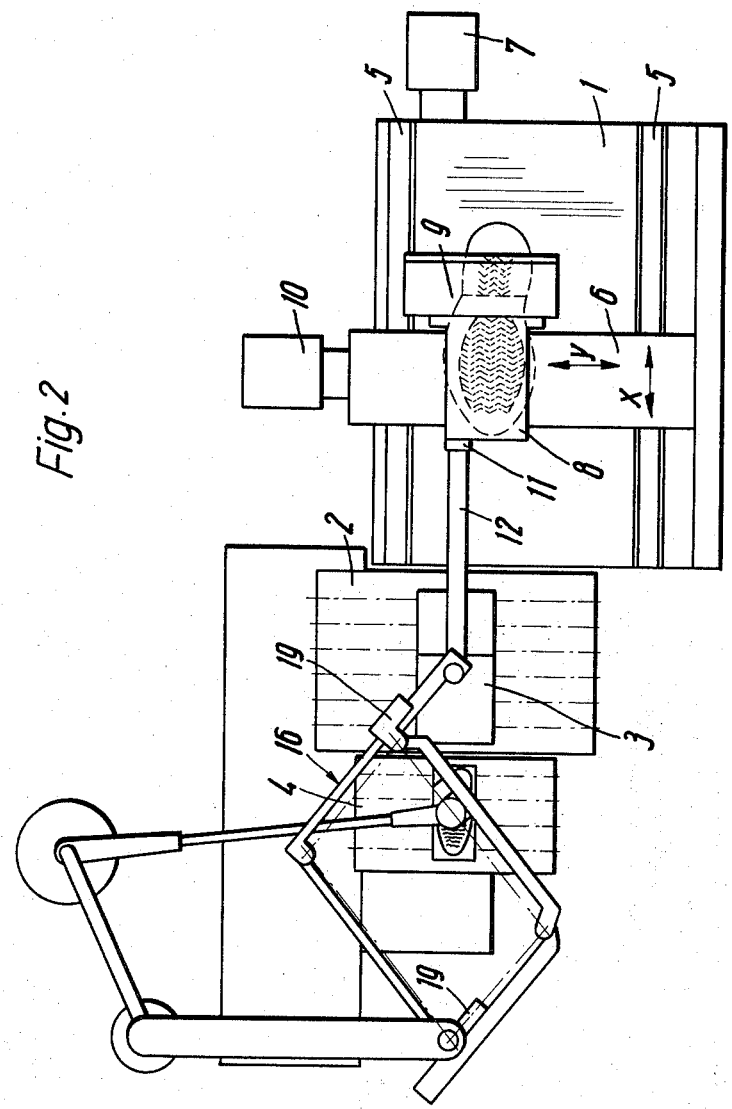

PATTERN TRANSMITTING DEVICES

The invention refers to a pattern transmitting device for use with a machine tool for the three-dimensional machining of a workpiece in accordance with a drawing and a pattern.

Three-dimensional machining of workpieces in, for example, a duplicating milling machine is carried out in general with the aid of an elevated pantograph, in which a tracer point normally guided by hand traces the height contours of a pattern. The movements of the tracer point are transmitted on a scale set by the pantograph to the milling cutter which machines from the workpiece a shape matching the pattern.

Machine tools are also known, especially engraver-millers working two-dimensionally, in which a drawing-reader apparatus is arranged at the front end of a pantograph lever. This reader apparatus formed, for example, as a photoelectric reader-head, follows the lines of a firmly clamped drawing and transmits these horizontal movements via the lever system of the pantograph to the cutting tool.

Both the above mentioned machine tools are well suited to certain machining processes. It is not possible with one of these machines, however, to machine a workpiece in accordance with a drawing and a pattern.

In accordance with the invention there is provided a pattern transmitting device for use with a machine having a tool for the three-dimensional machining of a workpiece in accordance with a drawing and a pattern, comprising a drawing reader apparatus having a reader head for automatically following the outline of the drawing and controlling the movement of the tool in a plane, a pantograph, a guide arrangement pivotally connected between the pantograph and the reader head for transmitting movements of the reader head, and a tracer device associated with the pantograph, wherein the tracer device in use follows the height contours of the pattern and controls the feed motion of the tool in a direction perpendicular to said plane.

A duplicating milling machine including a pattern transmitting device in accordance with the invention will now be described, by way of example, with reference to the accompanying drawings, in which:-

FIG. 2 is a plan view of the machine;

Figure 1:
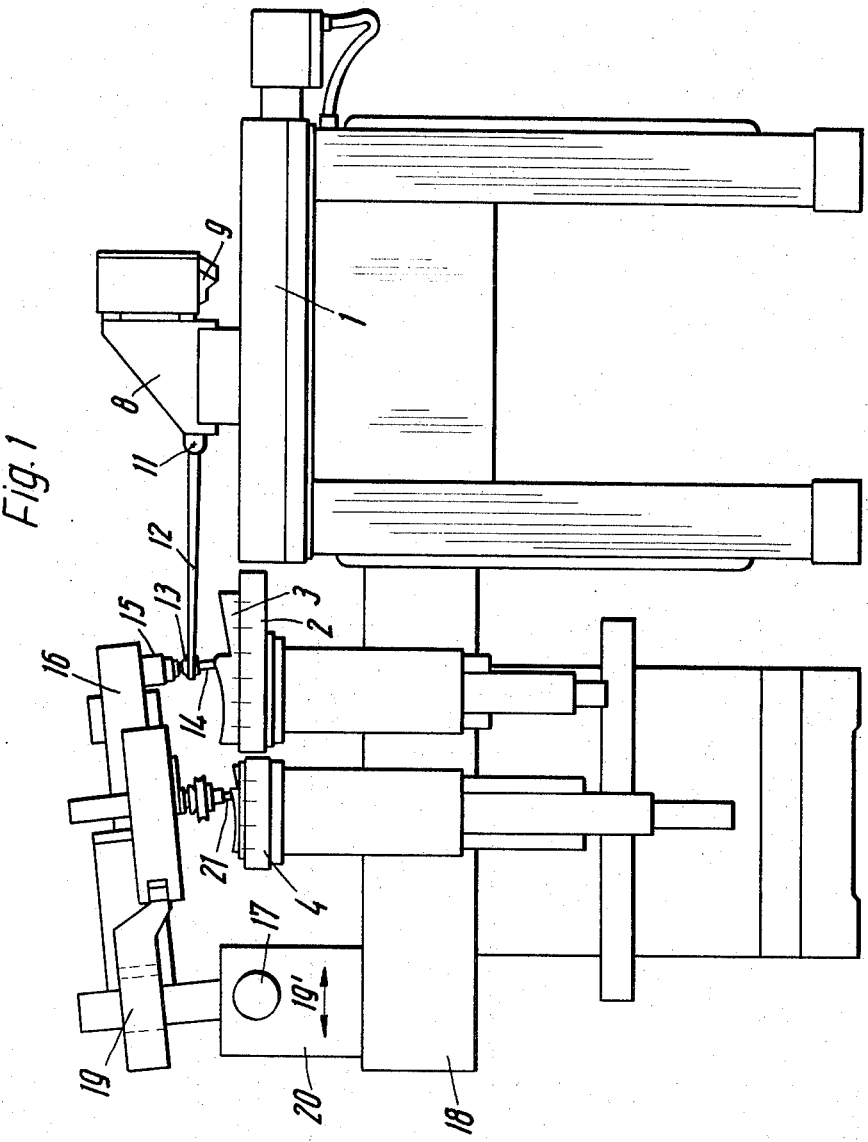
FIG. 1 is a side elevation of the machine.

The duplicating milling machine shown in FIGS. 1 and 2 includes a drawing-support table 1, a pattern table 2 for receiving a height contour pattern 3, and a workpiece or machining table 4. On the drawing-support table 1 a cross-slide 6 can be traversed in the direction of the X-axis on guides 5 by means of a positioning motor 7. On this cross-slide 6 in turn is a carrier 8 for an optical reader-head 9 which can be moved in the direction of the Y-axis by a second positioning motor 10.

On the front face of the carrier 8 an ear or lug 11 is provided, in which a guide bar 12 is journalled to pivot about an axis parallel with the Y-axis. The front end of the guide bar 12 is formed to receive a spherical bearing 13 on a tracer point 14 which picks off the respective height contours of the pattern 3. The tracer point 14 is carried by a clamp mounting 15 in which it can be axially adjusted and fixed. This clamp mounting 15 lies at the end of a pantographic linkage 16 which is pivotally connected to a part 20 of a frame 18 of the duplicating milling machine and is pivotable about a horizontal axis 17. This pivotal connection allows the vertical movements of the pantograph 16, of the tracer point 14, and of a tool including a milling cutter 21 that are necessary for three dimensional milling.

The ration of the pantograph or the scale between the pattern and the machined article, is suitably adjusted. A change or adjustment of the scale of transmission between the contours of the pattern and the feed of the cutter can be obtained by setting slides 19 provided on the lever arms of the pantograph 16 and an adjusting bracket 19'.

Figure 3B:
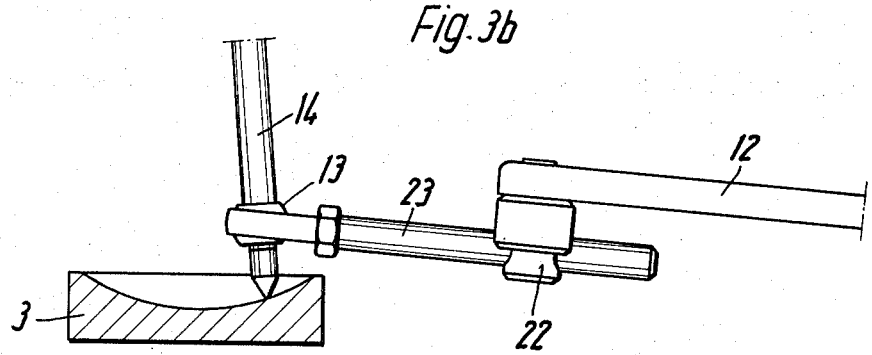
FIGS. 3a to 3c are sectional detail views of a modification showing a tracer point in a number of pick-off positions.
Figure 3A:
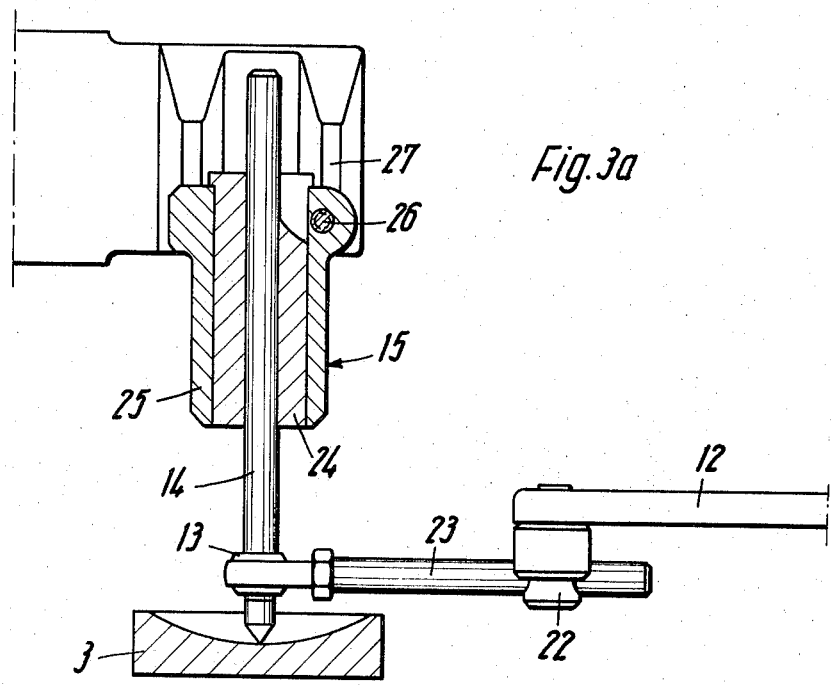
Figure 3C:
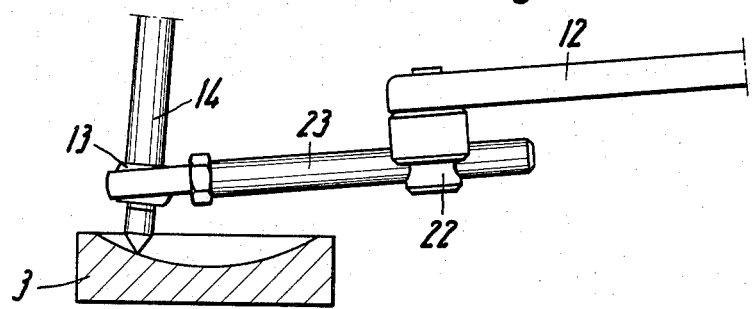
Figure 4A:
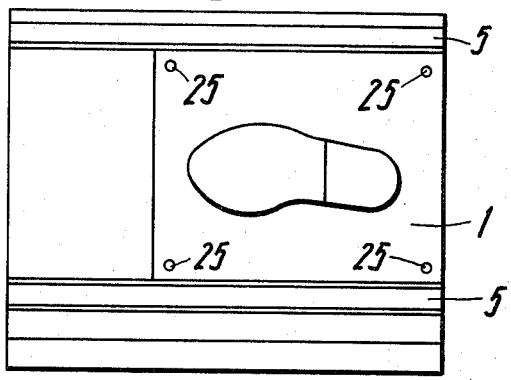
FIGS. 4a to 4d are plan views of a drawing support table of the machine showing a number of drawings of a workpiece clamped on in succession.
Figure 4B:
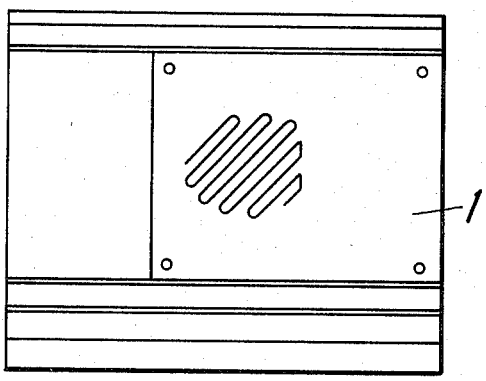
Figure 4D:
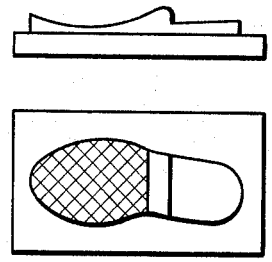
Figure 4C:
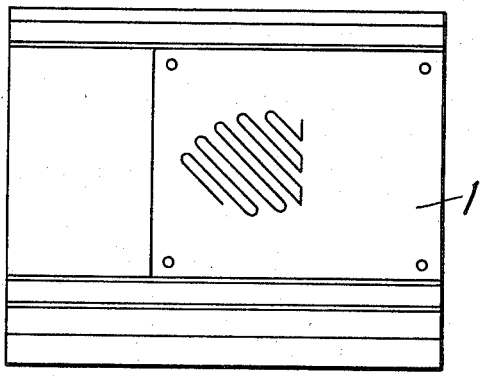

In FIGS. 3a to 3c a modified arrangement of the tracer point with its guide arrangement and mounting members is shown in different reading positions. For better adaptation to the various shapes of the pattern, the front end of the guide bar 12 is connected via a setting and locking device 22 to an intermediate member 23 the free end of which is formed as the bearing box for the spherical bearing 13 of the tracer point 14. In order to be able to adapt the position of the tracer point to the overall height of different patterns, it isaxially slidable in the clamp mounting 15 which consists of a liner 24 directly embracing the tracer point 14, and a clamping bush 25. The bush 25 has an upper annular projection 26 which bears against guides 27 in the bar of the pantograph.

The operation of the device will now be described. On the drawing-support table 1 a drawing which, for example, includes the outline of the shape of the sole of a shoe, is clamped down in exact alignment. The line on the drawing is followed by the photoelectric reader-head which can be traversed in the X- and Y- directions by means of the positioning motors 7 and 10, the guide-bar 12 following directly the horizontal movements of the reader-head. The contour pattern 3 is firmly clamped to the pattern table and, as shown in FIG. 2, can have, for example, a rectangular basic shape and is followed by the tracer point which is being guided horizontally by the guide-bar, and the combined horizontal and vertical movements are transmitted to the tool having the milling cutter 21 at the transmission ratio set on the pantograph.

For exact coordination of the drawing with the pattern, at the four corners of the drawing-support table 1, as may be seen from FIGS. 4a to 4d, four pins 25 are provided which stick through the drawing sheet in question and fix it in an exactly defined position. The advantage of this drawing-support table is realised when it is necessary to use a number of drawing figures for the milling of one workpiece as is the case with the example shown. The sheets of drawing figures are merely stretched one after the other onto the pins 25 without further setting processes being necessary. As an alternative the exact positioning of the drawing can be effected by marker crosses on the drawing support table.

In the above described machine it is not necessary that the pattern followed by the tracer point match exactly the flat shape of the finished workpiece. In the pattern merely the elevations and depressions have to be provided, which signifies a considerable easing in the production of the pattern as well as in the machining of the workpiece.

We claim:

1. In a pattern controlled machine having a tool movable in a plane and in a vertical feed direction perpendicular to said plane for three dimensional machining of a workpiece in accordance with a planar drawing and a contoured pattern, a pantograph including said tool and a tracer means operable to follow contours on said pattern and control motion of said tool in the vertical feed direction, pattern transmitting means comprising drawing reader means for automatically following the outline of said drawing, and guide means pivotally connected between said pantograph and said reader means for transmitting movements of said reader means to said tracer means to control the motion of said tool in said plane.

2. In a pattern controlled machine according to claim 1, including a fixed frame, wherein said pantograph is pivotally mounted on said fixed frame for pivotal movement about an axis parallel with said plane for transmission of vertical movements of said tracer means to said tool.

3. In a pattern controlled machine according to claim 1, wherein said pantograph includes lever arms and wherein said device includes setting means on said arms for adjusting porportional movements of said tool to said tracer means.

4. In a pattern controlled machine according to claim 1, further comprising a table for supporting said drawing, and a plurality of pins on said table for aligning and fixing said drawing.

5. In a pattern controlled machine according to claim 1, wherein said tool includes a milling cutter.

6. In a pattern controlled machine according to claim 1, wherein said guide means includes means for adjusting its effective length.

7. In a pattern controlled machine according to claim 1, wherein said guide means is pivotally connected directly to said tracer means.

8. In a pattern controlled machine according to claim 1, wherein said drawing reader means comprises an optical reader head.

* * * * *

UNITED STATES PATENT OFFICE
CERTIFICATE OF CORRECTION

Patent No. 3,863,543      Dated February 4, 1975

Inventor(s) Albert Bottcher and Hans Maass

It is certified that error appears in the above-identified patent and that said Letters Patent are hereby corrected as shown below:

[75] Inventors: Albert Böttcher, Scharzfeld Harz; Hans Maass, Bad Lauterberg im Harz, both of Germany

[73] Assignee: Franz Kuhlmann KG, Bad Lauterberg im Harz, Germany

Signed and Sealed this twenty-ninth Day of July 1975

[SEAL]

Attest:

RUTH C. MASON
*Attesting Officer*

C. MARSHALL DANN
*Commissioner of Patents and Trademarks*